(12) United States Patent
Fujiwara et al.

(10) Patent No.: US 9,011,167 B2
(45) Date of Patent: Apr. 21, 2015

(54) BUS BAR, METHOD OF MANUFACTURING THE SAME, AND BUS BAR AND CONNECTOR

(75) Inventors: Naoya Fujiwara, Kobe (JP); Akio Sugimoto, Kobe (JP); Hiroshi Hashimoto, Kobe (JP); Takayasu Fujiura, Kobe (JP); Naoki Kikuchi, Kobe (JP); Koji Inoue, Kobe (JP)

(73) Assignee: Kobe Steel, Ltd., Hyogo (JP)

(*) Notice: Subject to any disclaimer, the term of this patent is extended or adjusted under 35 U.S.C. 154(b) by 185 days.

(21) Appl. No.: 13/814,441

(22) PCT Filed: Sep. 27, 2011

(86) PCT No.: PCT/JP2011/072115
§ 371 (c)(1),
(2), (4) Date: Feb. 5, 2013

(87) PCT Pub. No.: WO2012/043581
PCT Pub. Date: Apr. 5, 2012

(65) Prior Publication Data
US 2013/0143426 A1 Jun. 6, 2013

(30) Foreign Application Priority Data
Sep. 28, 2010 (JP) ................................. 2010-216414

(51) Int. Cl.
H01R 4/60 (2006.01)
H01R 24/58 (2011.01)
(Continued)

(52) U.S. Cl.
CPC .................. *H01R 24/58* (2013.01); *H02G 5/08* (2013.01); *H01B 5/02* (2013.01); *H01R 43/00* (2013.01);
(Continued)

(58) Field of Classification Search
USPC ......... 439/212, 213, 210, 114, 121, 520, 251; 174/126.1, 68.2, 71 B, 88 B, 70 B; 361/637, 648
See application file for complete search history.

(56) References Cited

U.S. PATENT DOCUMENTS 3,636,237 A * 1/1972 Hafer ............................ 174/68.3
4,655,520 A * 4/1987 Cummings .................... 439/111
(Continued)

FOREIGN PATENT DOCUMENTS

DE 29 27 796 B1 11/1980
JP 06-60924 8/1994
WO WO 2006/051121 A1 5/2006

OTHER PUBLICATIONS

Office Action from European Patent Office in the corresponding Patent Application No. 11829134.3 with Supplementary European Search Report, dated Feb. 6, 2014.
(Continued)

*Primary Examiner* — Hae Moon Hyeon
(74) *Attorney, Agent, or Firm* — Studebaker & Brackett PC

(57) ABSTRACT

A busbar of the present invention increases yield per metal material in comparison to plate-shaped bus bars, enables provision of protrusions on a member located inside relative to a conductor, and enables formation of the busbar in a bent shape. The busbar of the present invention is provided with a busbar insulator (22), a busbar conductor (23), a busbar insulator (24), a busbar conductor (25), and a busbar insulator (26) formed outside of a busbar center conductor (21). These conductors and insulators are arranged alternately from the inner side towards the outer side in a radial direction (R) that intersects at right angles with the axial direction (A) of the bus bar. The busbar conductors (23, 25) are provided with openings (23o, 25o) along the whole length in the axial direction (A) thereof.

17 Claims, 8 Drawing Sheets

(51) Int. Cl.
*H01B 5/02* (2006.01)
*H01R 43/00* (2006.01)
*H02G 5/00* (2006.01)
*B29C 45/14* (2006.01)
*B29C 70/72* (2006.01)
*H02G 5/08* (2006.01)
*B29L 31/36* (2006.01)

(52) U.S. Cl.
CPC .............. *H02G 5/005* (2013.01); *B29L 2031/36* (2013.01); *B29C 45/14639* (2013.01); *B29C 70/72* (2013.01)

(56) References Cited

U.S. PATENT DOCUMENTS

| | | | |
|---|---|---|---|
| 7,438,566 B2* | 10/2008 | Chen | 439/110 |
| 8,500,473 B2* | 8/2013 | Fujiwara et al. | 439/213 |
| 2011/0059649 A1* | 3/2011 | Montena | 439/580 |
| 2012/0094553 A1* | 4/2012 | Fujiwara et al. | 439/891 |

OTHER PUBLICATIONS

International Search Report issued from the International Bureau in the corresponding International Application No. PCT/JP2001/072115, mailed Nov. 1, 2011, 2 pages.

* cited by examiner

FIG. 1
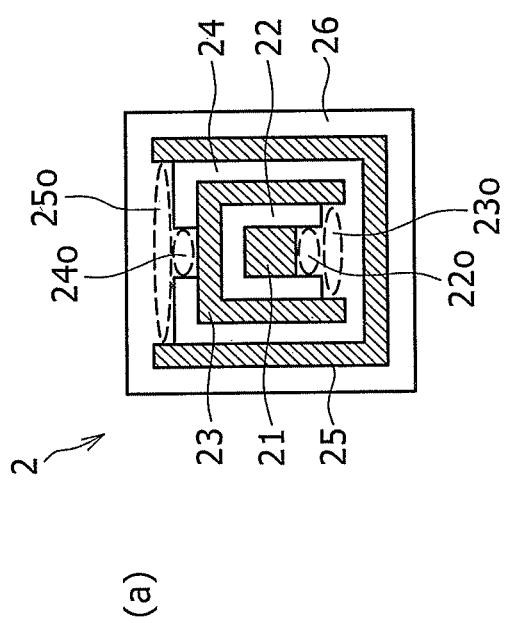
(a)
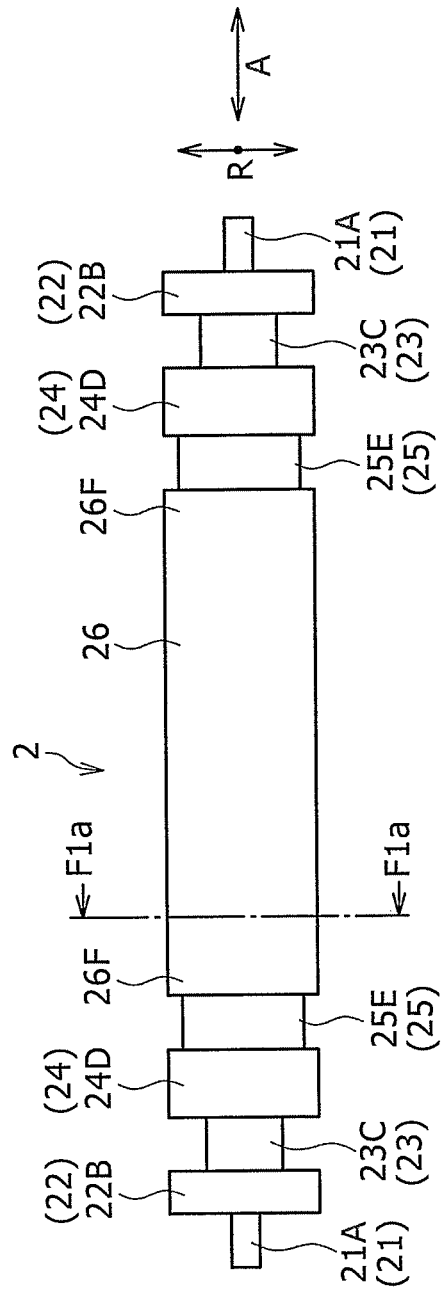
(b)

FIG. 6
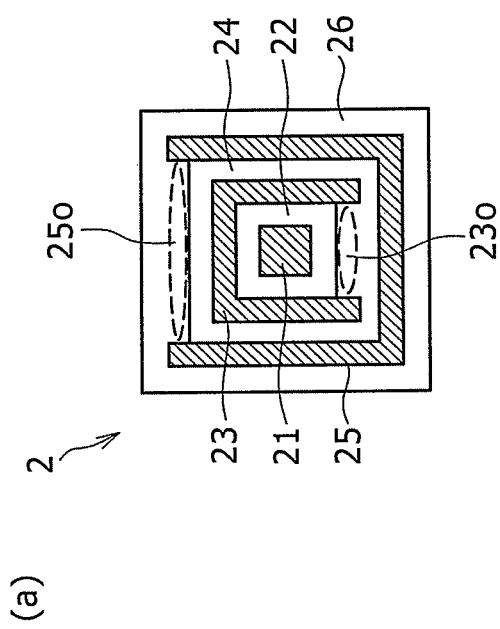
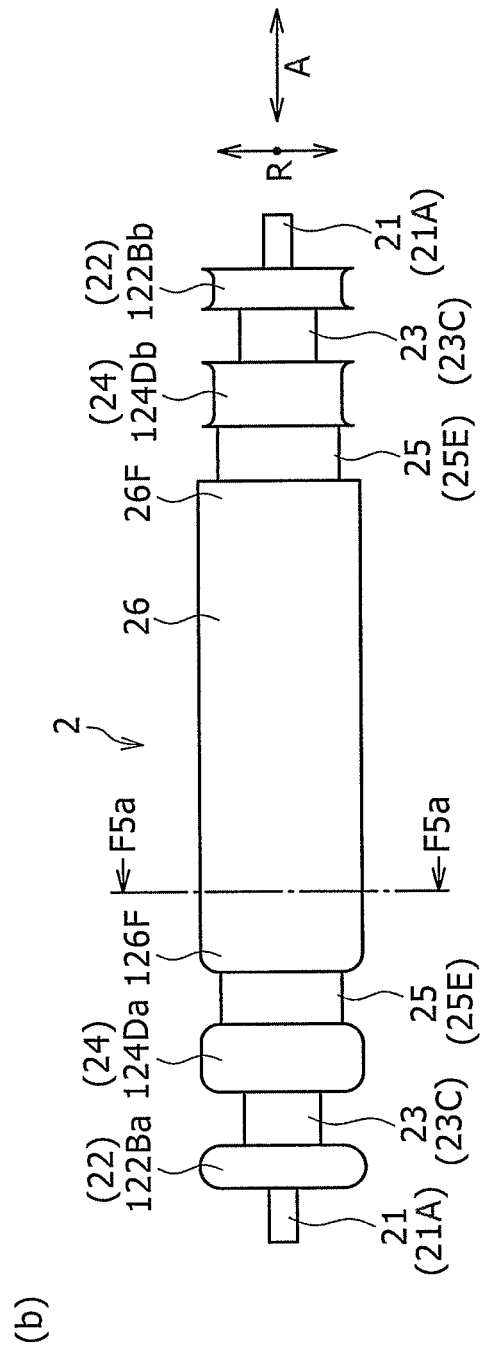

FIG. 7
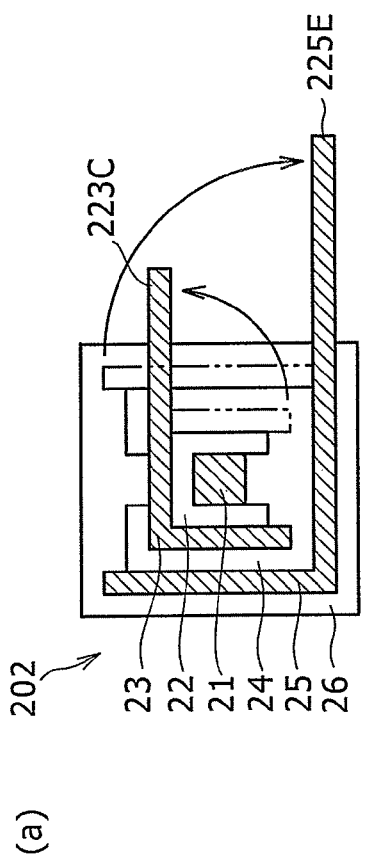
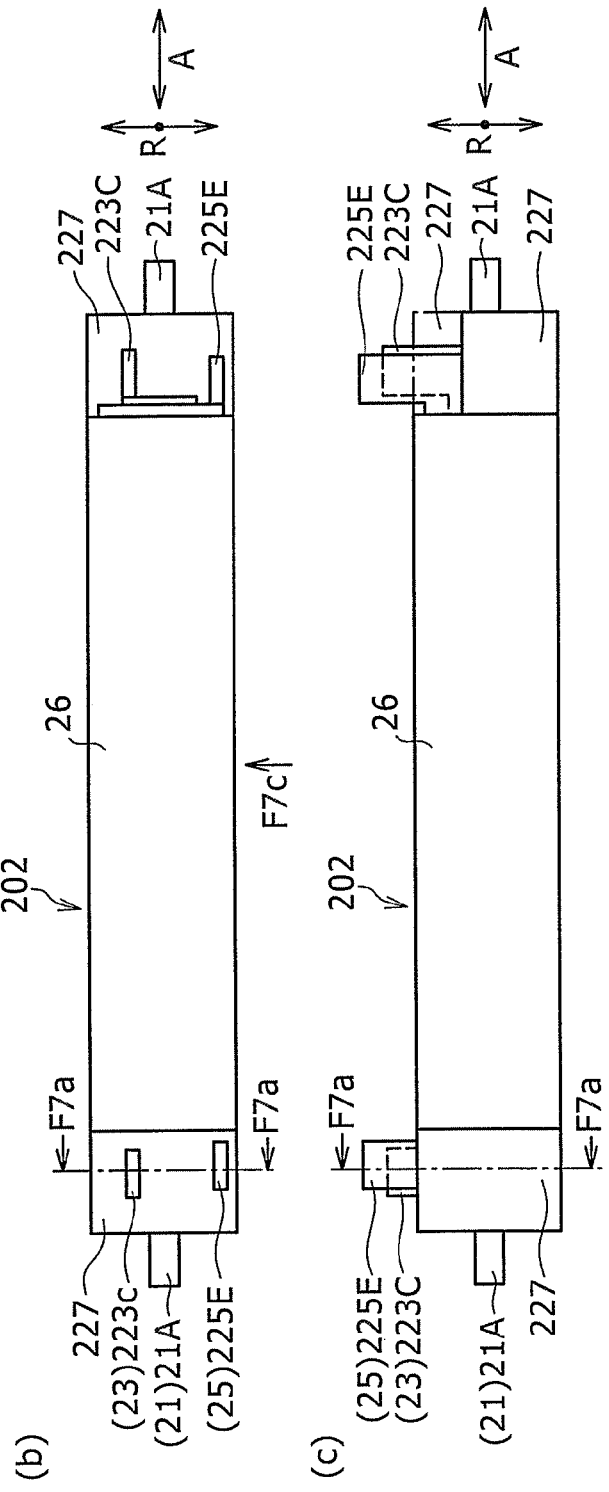

FIG. 8
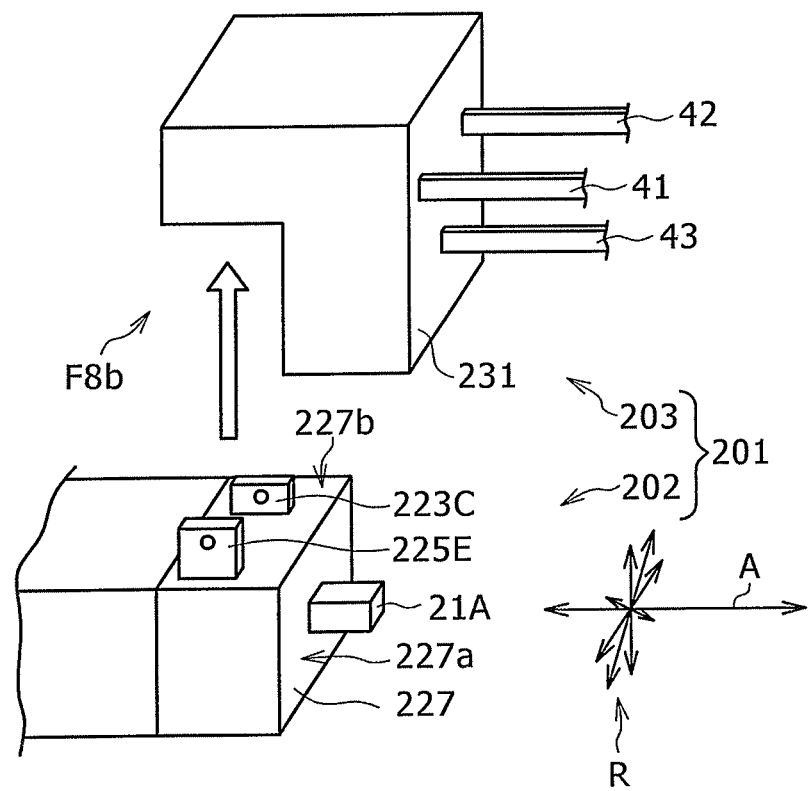
(a)
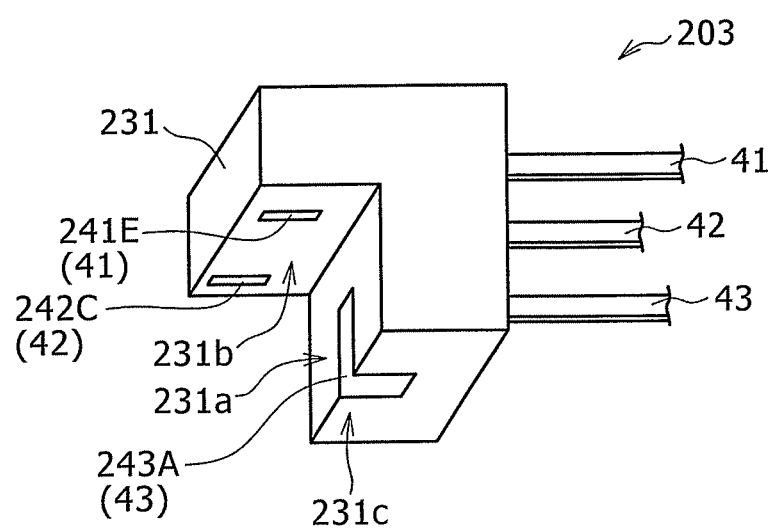
(b)

BUS BAR, METHOD OF MANUFACTURING THE SAME, AND BUS BAR AND CONNECTOR

TECHNICAL FIELD

The present invention relates to a bus bar used for electrical connection, a method of manufacturing the same, and a bus bar and connector.

BACKGROUND ART

Conventionally, bus bars have been used for electrical connection. For bus bars used in motors or other devices to which high-voltage high-amperage currents are applied, plate-shaped bus bars having a great surface area are used in terms of heat radiation and suppression of high-frequency electrical resistance (refer to, for example, Patent Document 1). The plate-shaped bus bars are produced by punching or bending a metal plate such as a copper plate or an aluminum plate. Further, terminals on both ends of the bus bars are connected by screwing.

CITATION LIST

Patent Document

Patent Document 1: JP. H06-060924 U

SUMMARY OF INVENTION

Technical Problem

Bus bars as described in Patent Document 1 have problems set forth below.

Firstly, a problem in production of the bus bars by punching metal plates is that a yield per metal material is generally low. In other words, a substantial amount of the material is wasted.

Further, when a machine using the bus bar is manufactured, inspected, or repaired, it is necessary to screw the terminals of the bus bar, which requires a problematically large number of operations. To connect the terminal on each end of three bus bars, for example, six terminals should be screwed.

To address the above-described problems, it is conceivable that the bus bars are designed to be a coaxial structure. As one example of the coaxial structure, the structure can be contemplated in which a conductor (a bus bar center conductor) is placed at the center of a bus bar with tubular insulators and tubular conductors alternately and coaxially disposed outside the conductor. It can be considered as a method for manufacturing the thus-structured bus bars that layers of the conductors and insulators are formed and arranged on a one-by-one basis. Specifically, the bus bar is manufactured by repetitively performing operation to form one layer of the insulator on an outer circumference of the conductor and insert a metal pipe (the tubular bus bar conductor) on an outside of the formed insulator.

However, with the above-described method of manufacturing the bus bar, it is possible to produce linearly shaped bus bars, but not possible to produce curved bus bars. That is, the metal pipe should be inserted on the outside of a curved insulator in order to produce the curved bus bar, which is not feasible in the above-described method. Meanwhile, even though the bus bar is linearly shaped, insertion of the metal pipe is also impossible in a case where a protrusion (such as a protrusion like a disc insulator for power transmission line) is provided to a component on an inner side of the conductor.

An object of the present invention is to provide a bus bar, which can contribute to a higher yield per metal material than that of a plate shaped bus bar, and allow for provision of a protrusion to a component on an inner side of a conductor and formation of a curved shape. It is also an object of the present invention to provide a method of manufacturing the bus bar, and a bus bar and connector.

Solution to Problem

A first aspect of the present invention is a bus bar used for electrical connection. The bus bar includes a bus bar center conductor. Further, the bus bar includes a plurality of bus bar insulators and a plurality of bus bar conductors provided on an outside of the bus bar center conductor, and alternately arranged from inside to outside in a radial direction orthogonal to an axial direction of the bus bar center conductor. On the bus bar conductor, an opening is formed across the entire bus bar conductor in the axial direction.

Here, the "axial direction" includes directions along a line as well as directions along a curve.

That is, the above-described bus bar is equipped with the plurality of bus bar insulators and the plurality of bus bar conductors, which are outwardly mounted on the bus bar center conductor and disposed alternately from inside to outside in the radial direction. Namely, in the bus bar, the bus bar center conductor, the bus bar insulators, and the bus bar conductors are coaxially mounted. Thus, compared to plate-shaped bus bars manufactured by punching metal plates, yield per metal material can be improved, and a wasted amount of material is reduced. As a result, raw material costs of materials for the bus bar can be reduced.

In addition, on the bus bar conductor in the above-described bus bar, the opening is formed along its entire length in the axial direction. This allows the bus bar conductor to be placed on the bus bar insulator from outside to inside along the radial direction at the time of manufacturing the bus bar. Although, in a case of a tubular bus bar conductor, the bus bar conductor should be inserted into the outside of the bus bar insulator at the time of manufacturing the bus bar, the insertion is not needed in the present invention because the bus bar conductor can be placed on the bus bar insulator. Accordingly, a protrusion (that protrudes outward in the radial direction) may be provided to a component located inside relative to the bus bar conductor, or the bus bar may be formed in a bent shape.

In a second aspect of the present invention, the bus bar center conductor and the bus bar conductor are formed by any one of aluminum, copper, aluminum alloy, and copper alloy (including materials mainly formed by the above-listed materials). The bus bar insulator is formed by a mixture of organic and inorganic materials, or formed by an organic material.

The conductors that form the bus bar are formed by any one of aluminum, copper, aluminum alloy, and copper alloy. These materials have a low specific resistance and an excellent workability. In other words, the material appropriate to conductors is used for the conductors forming the bus bar. This ensures further reliable electrical connection in the bus bar.

Further, the bus bar insulators in the above-described bus bar are formed by a mixture of organic and inorganic materials, or formed by an organic material. In other words, the material appropriate to insulators is used for the bus bar insulators. This ensures further reliable insulation in the bus bar.

In addition, using a mixture of organic and inorganic materials for the bus bar insulators has effects described below. In general, an organic material has a greater coefficient of linear expansion than that of a metallic material or an inorganic material. For this reason, by employing a mixture of organic and inorganic materials for the bus bar insulators, a difference in the coefficient of linear expansion between the conductor and the insulator can be reduced, and in turn, durability of the bus bar can be improved.

In a third aspect of the present invention, a contact surface in contact with a connector conductor, which is designed to make contact with the bus bar center conductor and the bus bar conductors (conductors installed in a connector so as to be connected to the bus bar), is plated in the bus bar center conductor and the bus bar conductors.

The above-described bus bar has a superior rust resistance and wear resistance in the contact surfaces to the case without plating. Further, because the contact surfaces are made smooth by the plating, a greater area of contact between the conductors forming the bus bar and the connector conductors can be obtained, to thereby reduce an electric resistance. Thus, due to the effects of the rust resistance, wear resistance, and the low electric resistance, the conductors forming the bus bar can be more reliably connected to the connector conductor.

In a fourth aspect of the present invention, a hole is formed on the bus bar center conductor into which a connector conductor to be contacted with the bus bar center conductor can be inserted along the axial direction.

In the above-described bus bar, electric connection can be established between the bus bar center conductor and the connector conductor by inserting the connector conductor into the hole of the bus bar center conductor. Accordingly, it is not necessary for the bus bar center conductor to be protruded longer from the bus bar insulator toward the axial outside, and thus an axial length of the bus bar can be reduced.

In a fifth aspect of the present invention, among the bus bar conductors and the bus bar insulators, a member positioned more inwardly than another member in the radial direction is protruded longer toward the outside in the axial direction compared to the another member. In the bus bar insulator, which is inwardly adjacent to the bus bar conductor in the radial direction, a portion protruded outward in the axial direction from the bus bar conductor is protruded outward in the radial direction from the bus bar conductor.

The bus bar insulator in the above-described bus bar protrudes toward the radial outside as described above. The protruding portion increases a creeping distance between the bus bar center conductor and the bus bar conductor (the shortest distance between conductors measured along the surface of an insulator). Consequently, electrical insulation between the conductors forming the bus bar can be further ensured without elongating the axial length of the bus bar, i.e. without increasing the size of the bus bar.

In a sixth aspect of the present invention, each end of the plurality of bus bar conductors in the axial direction includes a bus bar joint region formed so as to protrude outward from the bus bar insulator in the radial direction. A plurality of the bus bar joint regions are arranged side by side on a circumferential direction about the axial direction.

In the above-described bus bar, the axial end regions of the plurality of bus bar conductors are respectively provided with the bus bar joint regions formed so as to protrude outward from the bus bar insulators in the radial direction. Accordingly, electrical connection can be established using the bus bar joint regions.

Further, in the bus bar, the plurality of bus bar joint regions are arranged side by side along the circumferential direction around the axial direction. In this way, the axial length of the bus bar can be made shorter than that in a case where the plurality of bus bar joint regions are arranged side by side along the axial direction.

A seventh aspect of the present invention is a bus bar manufacturing method for manufacturing the bus bar, in which the bus bar insulators and the bus bar conductors are stacked from the inner side towards the outer side in the radial direction in the form of singly alternating layers on an outside of the bus bar center conductor. The manufacturing method includes a step of forming an insulating material on an outer periphery of the bus bar center conductor or the bus bar conductor in the radial direction, to thereby form the bus bar insulator, and a step of placing the bus bar conductor on the bus bar insulator from outside to inside in the radial direction.

Since the above-described manufacturing method includes, in particular, the step of placing the bus bar conductor on the bus bar insulator from outside to inside along the radial direction, the protrusion (which is outwardly protruded along the radial direction) may be provided to a component located inside relative to the bus bar conductor, and the bus bar may be formed in a bent shape.

An eighth aspect of the present invention is a bus bar and connector including the bus bar according to the fifth aspect and a connector formed so as to engage with an end of the bus bar. The connector includes a connector insulator, and a plurality of connector conductors capable of making contact with the bus bar center conductor and the bus bar conductor. The connector in which the end of the bus bar is inserted is pressed from outside to inside in the radial direction, to thereby connect the bus bar and the connector.

In the above-described bus bar and connector, the connector is formed in a shape capable of engaging with the end of the bus bar. Further, the end of the bus bar is inserted into the connector. Specifically, any joint region between the conductors forming the bus bar and the connector conductors is positioned inside the connector and covered with the connector. This can ensure reliable isolation between the outside of the bus bar and connector, and the joint region.

Further, in the bus bar and connector, when the connector in which the end of the bus bar is inserted is pressed from outside to inside in the radial direction, the bus bar and the connector are connected to each other. Namely, instead of establishing each connection between a plurality of conductors forming the bus bar and a plurality of connector conductors, the bus bar is connected to the connector only with the above-described pressing operation, so that fastening by means of screws, for example, is no longer necessary for connection between the conductors of the bus bar and the connector. This can facilitate connection between the bus bar and the connector and reduce operations necessary for the connection.

Still further, in the bus bar and connector, the connector is pressed as described above. In this way, the conductors forming the bus bar surely make contact with the connector conductors. As a result, reliable electrical connection can be established between the bus bar and the connector.

In a ninth aspect of the present invention, a modulus of compressive elasticity of the bus bar insulator is greater than that of the connector insulator.

In the bus bar and connector, due to the above setting, the connector is deformed more easily than the bus bar when the connector is pressed. Accordingly, the pressing of the connector can be facilitated, to thereby bring the conductors forming the bus bar into more reliable contact with the connector conductors. This can ensure more reliable electrical connection between the bus bar and the connector.

In a tenth aspect of the present invention, a plurality of the connector conductors respectively include connector joint regions. A plurality of the connector joint regions are disposed in a shifted manner so as to be respectively in contact with the bus bar center conductor or the bus bar conductors in a condition where the end of the bus bar is inserted in the connector. A gap between the plurality of connector conductors is filled with the connector insulator, to thereby integrate the connector into one unit.

In the above-described bus bar and connector, the connector joint regions of the plurality of connector conductors are disposed so as to be shifted in the axial direction as described above. In this way, the connector conductors can more reliably be isolated from each other compared to a case of the plurality of connector joint regions without the shift along the axial direction.

Further, in the connector, the gaps between the plurality of connector conductors are filled with the connector insulators. As a result, the connector conductors are isolated from each other.

Still further, the connector is integrated into one unit, which facilitates handling of the connector compared to a case where the connector is not integrated.

In an eleventh aspect of the present invention, the connector insulator includes a main connector insulator and an embedded body of which modulus of compressive elasticity is smaller than that of the main connector insulator. The embedded body is embedded in a notch of the main connector insulator.

In the above-described bus bar and connector, the embedded body having a smaller modulus of compressive elasticity than that of the main connector insulator is installed. Accordingly, compared to a case where the connector insulator is formed by only the main connector insulator, the connector can be pressed easily. As a result, more secure electrical connection can be established between the bus bar and the connector.

Moreover, the embedded body is embedded in the notch of the main connector insulator. This can further ensure isolation between the connector and the outside of the connector compared to a case without the embedded body in the notch.

BRIEF DESCRIPTION OF DRAWINGS

FIG. 1 (*a*) is an F1*a* cross section view of a bus bar according to a first embodiment, and FIG. 1 (*b*) is an overall view of the bus bar according to the first embodiment.

FIG. 6 (*a*) is an F5*a* cross section view of a bus bar in a third modification, and FIG. 6 (*b*) is an overall view of the bus bar in the third modification.

FIG. 7 (*a*) is an F1*a* cross section view of a bus bar in a second embodiment, FIG. 7 (*b*) is an overall view of the bus bar in the second embodiment, and FIG. 7 (*c*) is an F7*c* arrow view of FIG. 7 (*b*).

FIG. 8 (*a*) is a perspective view showing the bus bar and the connector depicted in FIGS. 7 (*a*), (*b*), and (*c*), and FIG. 8 (*b*) is an F8*b* arrow view of the connector shown in FIG. 8 (*a*).

DESCRIPTION OF EMBODIMENTS

Embodiment 1

Figure 2:
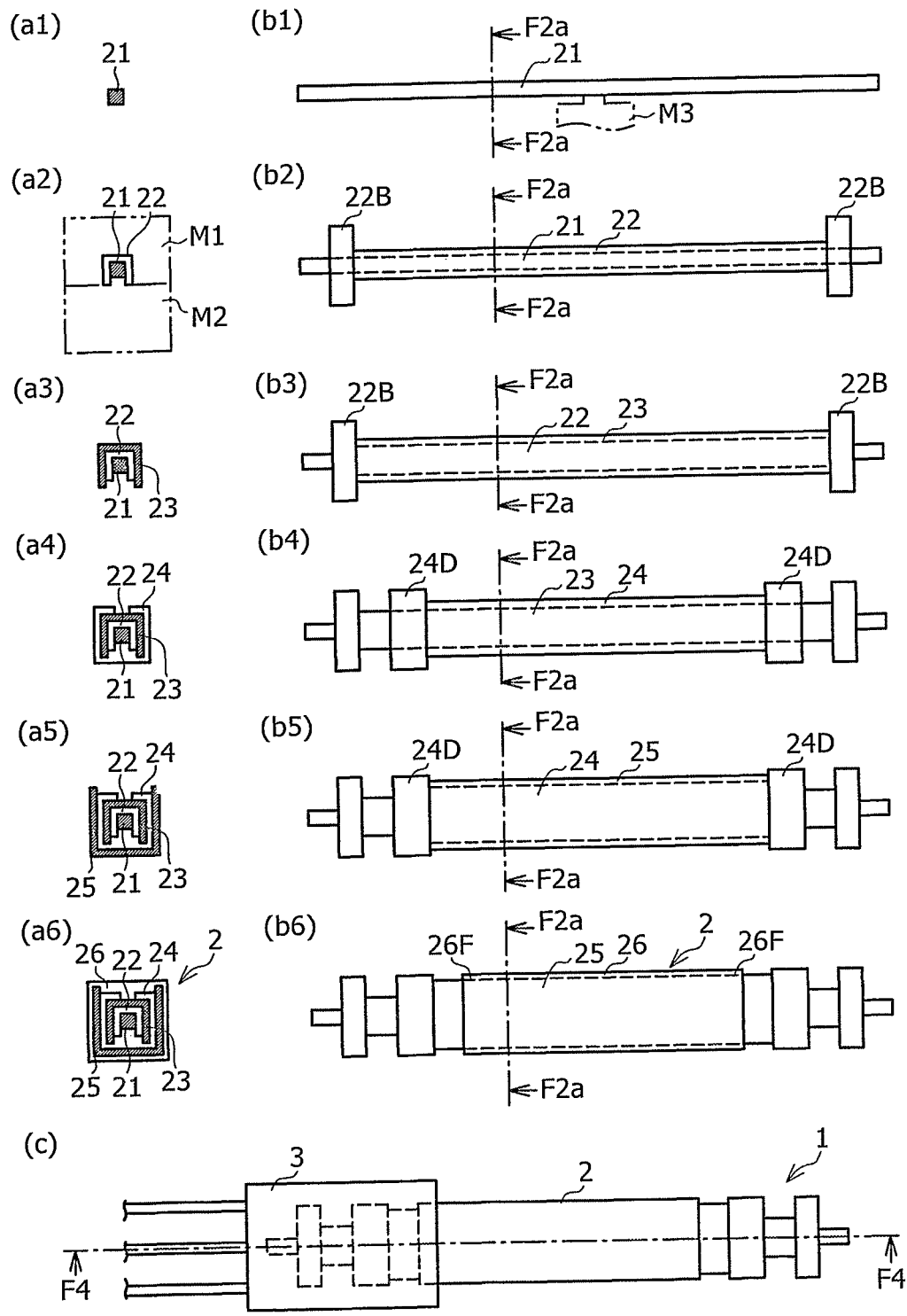
FIG. 2 (*a*1) to (*a*6) are F2*a* cross section views showing the bus bar of FIGS. 1 (*a*) and (*b*) in a sequential order of manufacturing processes, FIG. 2 (*b*1) to (*b*6) are overall views showing the bus bar of FIGS. 1 (*a*) and (*b*) in a sequential order of the manufacturing processes, and FIG. 2 (*c*) is an overall view showing a state where the bus bar depicted in FIGS. 1 (*a*) and (*b*) is inserted in a connector.
Figure 4:
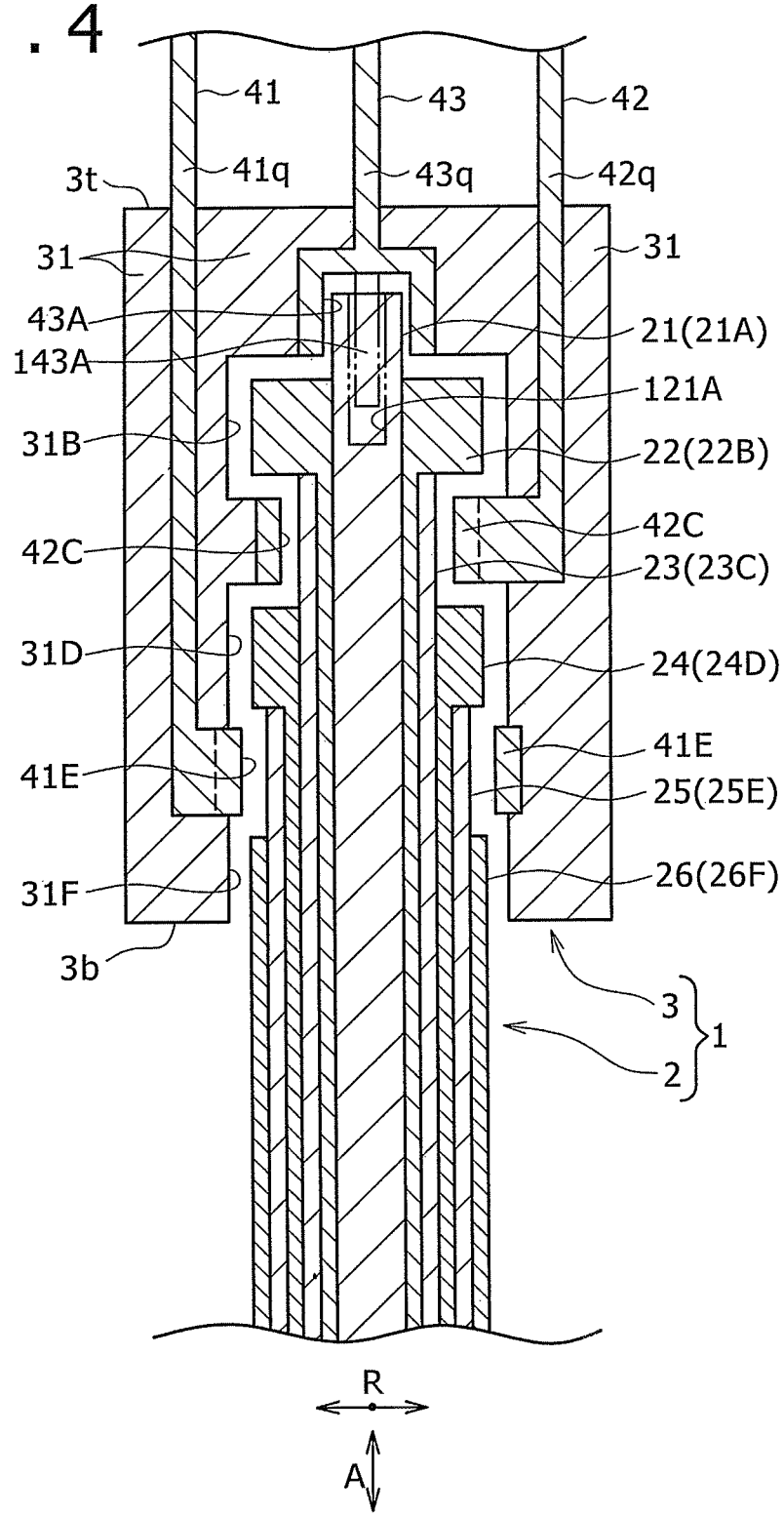
FIG. 4 is a cross section view of the bus bar and the connector depicted in FIG. 2 (*c*).

Hereinafter, a bus bar according to a first embodiment of the present invention, a manufacturing method for the bus bar, and an embodiment of a bus bar and connector will be described with reference to the drawings. Here, FIG. 1 (*a*) is a cross section viewed from an F1*a* arrow in FIG. 1 (*b*). FIG. 2 (*a*1) is a cross section viewed from an F2*a* arrow in FIG. 2 (*b*1). Similarly, FIG. 2 (*a*2) to (*a*6) show cross sections viewed from the F2*a* arrow in FIG. 2 (*b*2) to (*b*6). FIG. 2 (*a*1) to (*a*6) and (*b*1) to (*b*6) show the bus bar according to a sequential order of manufacturing processes. FIG. 2 (*c*) shows a state where the bus bar is inserted into a connector. FIG. 4 shows a cross section (a schematic diagram) viewed from an F4 arrow in FIG. 2 (*c*).

Figure 3:
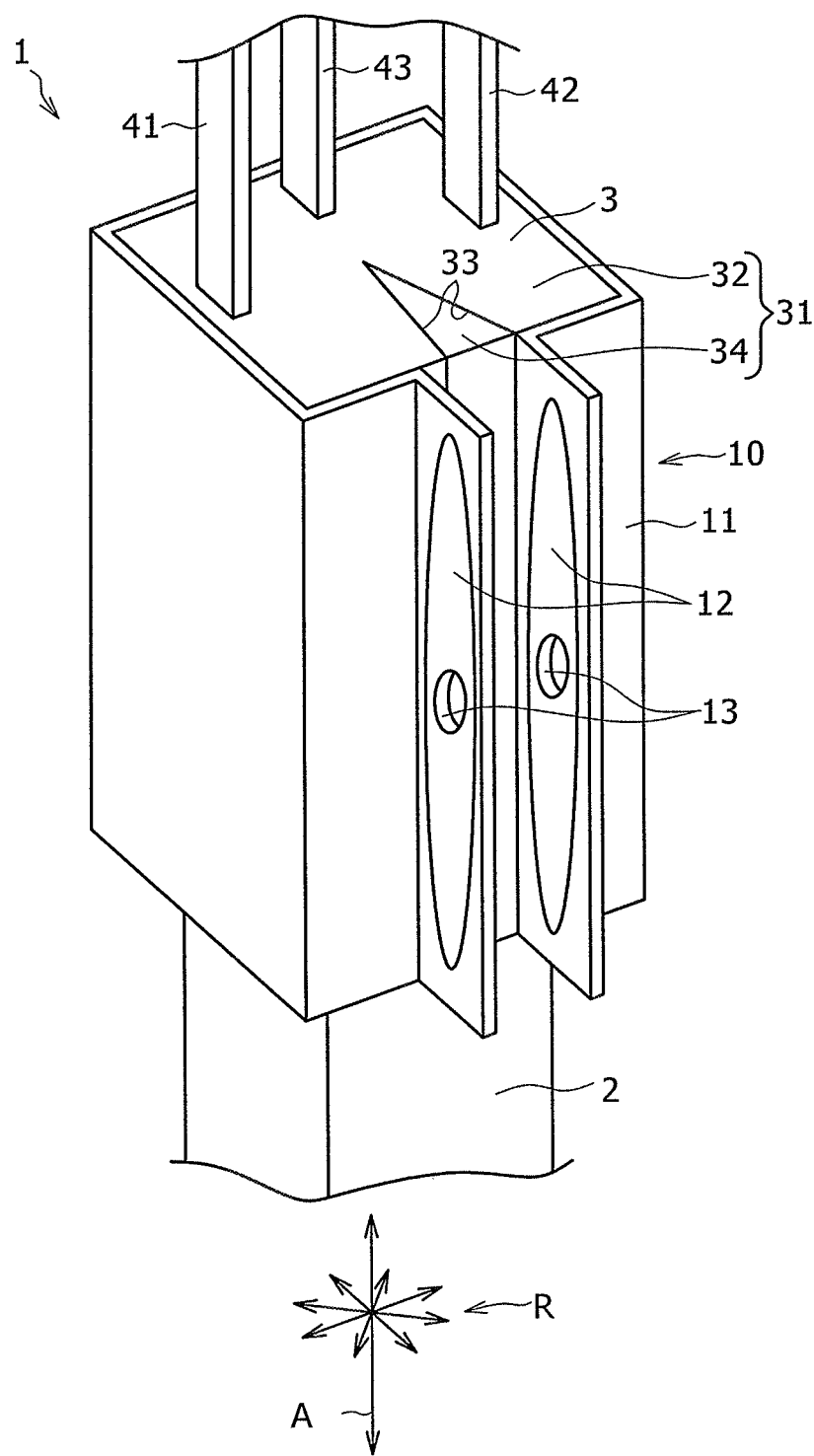
FIG. 3 is a perspective view of the bus bar and the connector depicted in FIG. 2 (*c*).

A bus bar and connector 1 (refer to FIG. 4) is used for electrical connection. For example, the bus bar and connector 1 is used for establishing connection between various electrical devices, such as electrical connection between a three-phase alternating current motor of an inverter controlled type and an inverter, electrical connection between a power supply and an inverter, electrical connection between a current controller for controlling an inverter and the inverter, electrical connection between various control devices and a power supply, and electrical connection between various control devices. In the electrical connection with the bus bar and connector 1, an axial end of a bus bar 2 is inserted into a connector 3, which is pressed by a fastening unit 10 mounted on the outside of the connector 3 as shown in FIG. 3, to establish connection between the bus bar 2 and the connector 3. The fastening unit 10 and other parts in the connector 3, the bus bar 2, a manufacturing method for the bus bar 2, and the connector 3 will be described below.

As shown in FIG. 3, the fastening unit 10 is a component to press, from outside to inside in a radial direction (which will be described in detail below), the connector 3 in which the end of the bus bar 2 is inserted. The fastening unit 10 includes a sleeve part 11 mounted on an outer periphery of the connector 3 in a radial direction R, and two flat plate parts 12 extending from the sleeve part 11.

The sleeve part 11 is a region placed so as to contact with the connector 3, and formed in a shape capable of pressing the connector 3. For example, when the connector 3 is shaped like a rectangular bottomed sleeve, the sleeve part 11 is formed in a shape of a substantially rectangular sleeve, or when the connector 3 is shaped like a bottomed cylinder, for example, the sleeve part 11 is formed in a substantially cylindrical shape. The sleeve part 11 has a void formed along an axial direction A to include a capability of pressing the connector 3. Preferably, the sleeve part 11 is formed and placed so as to entirely cover the connector 3 in the axial direction A (which will be described in detail below). In this case, the sleeve part is able to press the connector 11 more reliably.

The flat plate parts 12 are plate shaped regions to tighten the sleeve part 11. The flat plate parts 12 are two plate-shaped parts extending outward in the radial direction R from circumferential end regions of the sleeve part 11 (end regions adjacent to the void along the axial direction A of the sleeve part 11). Each of the two flat plate parts 12 includes a bolt hole 13, for example, in a central region. As a result of tightening a space between the flat plate parts 12 by means of a bolt (not illustrated) inserted through the bolt hole 13, the connector 3 is pressed by the sleeve part 11. Preferably, the central region of the flat plate part 12 may be expanded by convexly molding the central region into an elliptic shape, and accordingly reinforced.

<Bus Bar>

The bus bar 2 is a component to be connected, as shown in FIG. 1, to the connector 3 (refer to FIG. 4), and used for electrical connection. The bus bar 2 is substantially shaped like a rod, and may have a linear shape as shown in FIG. 1 (b). In addition, the bus bar 2 may has a curvilinear shape (such as a curved shape or an angulated shape) depending on placement, clearance, or other settings of electrical devices in which the bus bar 2 and the connector 3 (refer to FIG. 4) are used. The length of the bus bar 2 in the axial direction A is, for example, 12 cm to 13 cm.

The bus bar 2 has a substantially coaxial layered structure as shown in FIG. 1 (a). The bus bar 2 has a three layer (triplex) structure forming of three conductors and three insulators.

The bus bar 2 has in its center a bus bar center conductor 21 of which axis direction is indicated as the axial direction A. In other words, the axial direction A also matches the axis direction of the bus bar 2. It should be noted that even when the bus bar 2 has the curvilinear shape, a direction along a central axis of the bus bar 2 (a central axis of the bus bar center conductor 21) is referred to as the axial direction A.

The bus bar 2 includes a plurality of bus bar insulators 22, 24 and bus bar conductors 23, 25 alternately arranged from inside to outside in the radial direction R orthogonal to the axial direction A of the bus bar center conductor 21 (more specifically, the radial direction R that passes through the center axis of the bus bar center conductor 21 and intersects the axial direction A at right angle). These insulators and conductors are outwardly installed on the bus bar center conductor 21. Specifically, the bus bar 2 is equipped with the bus bar center conductor 21, the bus bar insulator 22, the bus bar conductor 23, the bus bar insulator 24, the bus bar conductor 25, and the bus bar insulator 26 in that order from inside to outside along the radial direction R. Note that in FIG. 1 (a), which is a cross sectional view, the bus bar insulators are not hatched for the purposes of simplicity (the same applies to FIG. 2 (a1) to (a6), FIG. 6 (a), and FIG. 7 (a)).

As shown in FIG. 1 (b), the end of the bus bar 2 is designed to function as a contact with the connector 3 (refer to FIG. 4), and formed in a shape, which can provide an enough creeping distance. The end of the bus bar 2 is equipped with the conductors stepwisely lined up along the axial direction A (formed in a substantially convex shape). In other words, the bus bar center conductor 21, the bus bar insulators 22, 24, 26, and the bus bar conductors 23, 25 are outwardly protruded longer in the axial direction A as their positions approach inside in the radial direction R. Specifically, a bus bar joint region 21A (of which length is 6 mm, for example, in the axial direction A) of the bus bar center conductor 21, a protruding region 22B (5 mm for the same length) of the bus bar insulator 22, a bus bar joint region 23C (6 mm for the same length) of the bus bar conductor 23, a protruding region 24D (8 mm for the same length) of the bus bar insulator 24, a bus bar joint region 25E (6 mm for the same length) of the bus bar conductor 25, and an end region 26F of the bus bar insulator 26 are outwardly protruded along the axial direction A in a manner that a protruded length thereof increases in that order.

A protrusion shaped like a disc insulator for transmission line is formed at the end of the bus bar 2. As shown in FIG. 1 (b) and FIG. 4, in the bus bar insulator 22 inwardly adjoining the bus bar conductor 23 in the radial direction R, a region protruded longer than the bus bar conductor 23 toward the outside in the axial direction A (the protruding region 22B) is outwardly protruded in the radial direction R from the bus bar conductor 23. Further, in the bus bar insulator 24 inwardly adjoining the bus bar conductor 25 in the radial direction R, a region protruded longer than the bus bar conductor 25 in the axial direction A (the protruding region 24D) is outwardly protruded in the radial direction R from the bus bar conductor 25. Preferably, cross sections of the protruding regions 22B and 24D viewed from the axial direction A are designed to coincide with the corresponding cross section of the bus bar insulator 26, or defined to be smaller than that of the bus bar insulator 26. In this case, it can be avoided that the connector 3 becomes greater in size than is necessity (refer to FIG. 4).

The conductors forming the bus bar 2 are made of materials indicated below. The bus bar center conductor 21, the bus bar conductors 23 and 25 are formed by any one of aluminum, copper, aluminum alloy, and copper alloy (including materials mainly formed by the above-listed materials). Aluminum such as, for example, 1060 (pure aluminum) may be used. The conductor implemented using 1060 (pure aluminum) is far superior in electrical conductivity. Aluminum alloy such as, for example, 6061 (aluminum to which a small amount of manganese and silicon are added) may be used. The conductors with the aluminum alloy used therein are far superior in strength. Copper such as, for example, oxygen free copper (OFC), tough pitch copper may be used. Further, copper alloy such as for example, precipitation type copper alloy obtained by adding a small amount of iron and phosphor to copper, specifically, "KFC (Registered Trademark)", for example, may be used. When the "KFC (Registered Trademark)" is used for the conductors forming the bus bar 2, adhesion of the conductors forming the bus bar 2 (the bus bar center conductor 21 and bus bar conductors 23, 25) to the bus bar insulators 22, 24 and 26 can be improved, and an interfacial peeling strength therebetween can be accordingly increased, to thereby preventing them from readily peeling away from each other.

The conductors forming the bus bar 2 are treated by plating. In the bus bar center conductor 21 and the bus bar conductors 23 and 25, contact surfaces (the bus bar joint regions 21A, 23C and 25E) to be contacted with the connector conductors 41 to 43 (refer to FIG. 4) are plated.

The insulators (the bus bar insulator 22, 24, and 26) of the bus bar 2 constituents are formed by a mixture of organic and inorganic materials, or formed by an organic material. The organic material is formed by one or more materials selected from a group consisting of, for example, thermoplastic resin, thermoset resin, and rubber. Meanwhile, the inorganic material is formed by one or more materials selected from a group consisting of, for example, crystalline silica powder, molten silica powder, glass fiber, talc powder, mica powder, aluminum oxide powder, magnesium oxide powder, aluminum nitride powder, boron nitride powder, silicon nitride powder, and silicon carbide powder. Any desired material may be selected depending on a method for manufacturing the bus bar insulators and other factors.

The bus bar center conductor 21 is rod shaped as shown in FIGS. 2 (a1) and (b1), and it is, for example, a rectangular column. The bus bar center conductor 21 may be a column of a polygonal shape other than a rectangle, a circular column, or the like. As shown in FIG. 4, the bus bar center conductor 21, which is a bus bar joint region 21A protruded outward from the bus bar insulator 22 in the axial direction A, functions to establish electrical connection with a connector conductor 43.

The bus bar insulator 22 is a component for isolating the bus bar center conductor 21 from the bus bar conductor 23. As shown in FIG. 1 (*a*), the cross section of the bus bar insulator 22 viewed from the axial direction A has the geometry for surrounding the bus bar center conductor 21 and includes an insulator opening 22*o*.

The insulator opening 22*o* is a resultant region formed by fixing (retaining) the bus bar center conductor 21 in a mold M2, as shown in FIG. 2 (*a*2), when the bus bar insulator 22 is injection molded (which will be described in detail further below).

As shown in FIG. 4, the bus bar conductor 23 is mounted on an outside of the bus bar insulator 22 (other than the protruding region 22B) in the radial direction R, and functions to establish connection with a connector conductor 42 in the bus bar joint region 23C located on the end region of the bus bar conductor 23 in the axial direction A. As shown in FIG. 1 (*a*), the bus bar conductor 23 has, in a cross section viewed from the axial direction A, an opening 23*o* along the entire length of the bus bar conductor 23 in the axial direction A.

The opening 23*o* is a region formed for a purpose of allowing the bus bar conductor 23 to be placed on the bus bar insulator 22 from outside to inside in the radial direction R (the direction from top to bottom in FIG. 1 (*a*)) and fitted thereon. That is, the opening 23*o* is an open region of the bus bar 23 facing outward from inside in the radial direction R. A cross section of the bus bar conductor 23 with the opening 23*o* viewed from the axial direction A has, for example, a geometry of a rectangle of which one side is removed, or may have a shape of a semicircular arch, a letter U, a letter V, or the like. The bus bar conductor 23 provided with the opening 23*o* is formed by bending an elongated rectangular plate, for example.

As shown in FIG. 1 (*a*) and FIG. 4, the bus bar insulator 24 is a component to isolate the bus bar conductor 23 from the bus bar conductor 25. As shown in FIG. 1 (*a*), the bus bar insulator 24 has an insulator opening 24*o* as in the case of the bus bar insulator 22.

As shown in FIG. 4, the bus bar conductor 25 is mounted on an outside of the bus bar insulator 24 (other than the protruding region 24D) in the radial direction R, and functions to establish connection with a connector conductor 41 at the bus bar joint region 25E located on the end in the axial direction A. As shown in FIG. 1 (*a*), the bus bar conductor 25 has an opening 25*o*, similarly to the bus bar conductor 23. The other structure of the bus bar conductor 25 is identical to that of the bus bar conductor 23.

The bus bar insulator 26 is a component to isolate the bus bar conductor 25 from the outside of the bus bar 2 as shown in FIG. 1 (*a*) and FIG. 4.

<Manufacturing Method of Bus Bar>

Next, a manufacturing method of the bus bar 2 will be described. The bus bar 2 illustrated in FIG. 1 (*a*) is produced by stacking the bus bar insulators 22, 24 and the bus bar conductors 23, 25 on the outside of the bus bar center conductor 21 in singly alternating layers from inside to outside in the radial direction R. In particular, the bus bar 2 is manufactured according to process steps 1 to 5 described below.

The process step 1 is a step of forming an insulating material, as shown in FIGS. 2 (*a*2) and (*b*2), on an outer periphery of the bus bar center conductor 21 depicted in FIGS. 2 (*a*1) and (*b*1) in the radial direction R (hereinafter, refer to FIG. 1 (*b*) for the radial direction R and the axial direction A), to thereby form the bus bar insulator 22. Firstly, as shown in FIG. 2 (*a*2), molds M1 and M2 are placed around the bus bar center conductor 21. Next, after filling the insulating material in the molds M1 and M2 through injection molding, casting under vacuum, pressurized casting, or the like, the insulating material is solidified. For the insulating material of thermoplastic resin, the insulating material is solidified by cooling. For the insulating material of thermosetting resin, the insulating material is solidified with a three-dimensional cross linking treatment by means of heating. For the insulating material of rubber, the insulating material is solidified with three-dimensional cross linking or other treatments by means of vulcanization.

Further, in the process step 1, for example, a lower part of the bus bar center conductor 21 is constrained, retained, and fixed by, for example, a protrusion of the mold M2. This can protect the bus bar center conductor 21 from being bent by a pressure of the insulating material (such as a resin pressure) applied during injection molding. Further, the insulator opening 22*o* (refer to FIG. 1 (*a*)) is formed in the bus bar insulator 22. In this connection, a part of the bus bar center conductor 21 on which the bus bar insulator 22 (other than the protruding region 22B) is coated may be retained entirely by the mold M2, or may be retained partially at one location or two or other locations by a mold M3 as shown in FIG. 1 (*b*1). It should be noted that FIG. 6 (*a*) shows a cross section viewed from the axial direction A (a cross section viewed from an F5*a* arrow in FIG. 6 (*b*)) showing the bus bar 2 in a case where the above-described retaining is not performed on a region of the F5*a* cross section (which will be described further below).

The process step 2 is a step of placing the bus bar conductor 23 on the bus bar insulator 22, as shown in FIGS. 2 (*a*3) and 2(*b*3) so as to be fitted thereon from outside to inside in the radial direction R (from top to bottom in the drawings). As shown in FIG. 2 (*b*3), the bus bar conductor 23 is placed between the two protruding regions 22B located on both ends of the bus bar insulator 22 in the axial direction A in the process step 2.

The process step 3 is a step of forming the insulating material, as shown in FIGS. 2 (*a*4) and (*b*4), on an outer periphery of the bus bar conductor 23 in the radial direction R, to thereby form the bus bar insulator 24. In this step, the insulator opening 24*o* (refer to FIG. 1 (*a*)) is formed at a location where the bus bar 23 is retained by a mold (not illustrated). Here, solidification of the insulating material and the effect of retaining by the mold are identical to those in the process step 1.

The process step 4 is a step of placing the bus bar conductor 25 on the bus bar insulator 24 as shown in FIGS. 2 (*a*5) and (*b*5) so as to be fitted thereon from outside to inside in the radial direction R (from bottom to top in the drawings). In the process step 4, as shown in FIG. 2 (*b*5), the bus bar conductor 25 is placed between the two protruding regions 24D located on both ends of the bus bar insulator 24 in the axial direction A.

The process step 5 is a step of forming, as shown in FIGS. 2 (*a*6) and (*b*6), the insulating material on an outer periphery of the bus bar conductor 25 in the radial direction R, to thereby form the bus bar insulator 26. Here, in the process step 5, because injection molding is performed while retaining the bus bar 2 at both ends outside the bus bar insulator 26 in the axial direction A, an opening such as the insulator openings 22*o* and 24*o* is not formed in the bus bar insulator 26 as shown in FIG. 1(*a*).

<Connector>

The connector 3 is a component into which the end of the bus bar 2 is inserted to establish electrical connection as shown in FIG. 2 (*c*) and FIG. 4, and attached to a motor, a generator, a power supply, and other devices, which are not illustrated. As shown in FIG. 4, the connector 3 is, for example, a bottomed sleeve-like component formed so as to engage with the end of the bus bar 2. For example, when the cross section of the bus bar 2 viewed from the axial direction A is a rectangle as shown at FIG. 1 (a), the connector 3 is in the shape of a bottomed rectangular sleeve. Hereinafter, explanation is provided assuming a condition that the bus bar 2 is inserted into the connector 3. That is, the axial direction A and the radial direction R of the bus bar 2 are also defined as an axial direction and a radial direction of the connector 3. As shown in FIG. 4, the connector 3 includes a connector insulator 31, the conductors forming the bus bar 2, a plurality of connector conductors 41, 42, and 43 (capable of contacting with the bus bar center conductor 21 and the bus bar conductors 23 and 25).

The connector 3 is formed in a shape capable of engaging with the end of the bus bar 2. Specifically, to enable engagement with the protrusions shaped like the disc insulator for transmission line at the end of the bus bar 2 (the protruding regions 22B, 24D) and the end region 26F of the bus bar insulator 26, regions that are outwardly recessed in the radial direction R (recessed regions 31B, 31D, and 31F) are formed in the connector insulator 31.

Further, in the connector 3, connector joint regions 41E, 42C, and 43A of the connector conductors 41, 42, and 43 are placed on positions that are shifted along the axial direction A so that they are in contact with the conductors (the bus bar joint regions 25E, 23C, and 21A) that form the bus bar 2. Still further, the connector joint regions 41E, 42C, and 43A are placed in a condition of inwardly protruding in the radial direction R compared to the recessed regions 31B, 31D, and 31F so as to be engaged with the bus bar joint regions 25E, 23C, and 21A.

Specifically, the connector 3 includes the recessed region 31F, the connector joint region 41E, the recessed region 31D, the connector joint region 42C, the recessed region 31B, and the connector joint region 43A arranged between both end regions of the connector 3 in the axial direction A from an end region 3b, in which the bus bar 2 is inserted, to the other end region 3t on the opposite side, i.e. in the order from top to bottom of FIG. 4. The recessed region 31F engages with the end region 26F of the bus bar insulator 26, while the connector joint region 41E engages with the bus bar joint region 25E in contact therewith. The recessed region 31D engages with the protruding region 24D, while the connector joint region 42C engages with the bus bar joint region 23C in contact therewith. The recessed region 31B engages with the protruding region 22B, while the connector joint region 43A engages with the bus bar joint region 21A in contact therewith. This structure prevents the bus bar 2 inserted in the connector 3 from being displaced easily along the axial direction A, and can, in turn, ensure firm electrical connection between the bus bar 2 and the connector 3.

Materials of the conductors (the connector conductors 41 to 43) that form the connector 3 are similar to those of the conductors (the bus bar center conductor 21, and the bus bar conductors 23 and 25) that constitute the bus bar 2. Materials of the connector insulator 31 are similar to those of the insulators (the bus bar insulators 22, 24, and 26) that form the bus bar 2. The connector 3 is produced, for example, by inserting a plurality of the connector conductors 41 to 43 with a predetermined interval therebetween in a mold, filling the mold with an insulating material through injection molding, molding under vacuum, pressurized molding, or other processing, and solidifying the insulating material.

The connector insulator 31 fills gaps between the plurality of connector conductors 41 to 43. As a result, the connector 3 is integrated into one unit.

Since the bus bar 2 and the connector 3 are connected to each other by pressing the connector 3 from outside to inside in the radial direction R as described above, the connector insulator 31 is designed to facilitate the pressing action. In particular, a modulus of compressive elasticity of the bus bar insulator 22 is greater than that of the connector insulator 31. Further, as shown in FIG. 3, the connector insulator 31 includes a main connector insulator 32 and an embedded body 34 having a modulus of compressive elasticity smaller than that of the main connector insulator 32. The embedded body 34 is embedded in a notch 33 provided along the axial direction A in the main connector insulator 32.

Note that although the embedded body 34 is located between the two flat plate parts 12 of the fastening unit 10 in FIG. 3, the outer surface of the embedded body 34 may be covered by the sleeve part 11 of the fastening unit 10. In this case, the pressed embedded body 34 in the connector 3 is resistant to slipping off the main connector insulator 32, and prevented from expanding outward in the radial direction R. Thus, the connector 3 can be pressed more reliably.

As shown in FIG. 4, the connector conductors 41, 42, and 43 consist of the connector joint regions 41E, 42C, and 43A and strip plate regions $41q$, $42q$, and $43q$ coupled to the connector joint regions 41E 42C, and 43A.

The connector joint regions 41E, 42C, and 43A are formed, in view of readiness to make contact with the bus bar joint regions 25E, 23C, and 21A, in shapes that conform to the outsides of the bus bar joint regions 25E, 23C, and 21A in the radial direction R. For example, as shown in FIG. 1 (a), when the cross sections of the bus bar center conductor 21 and the bus bar conductors 23 and 25 seen from the axial direction A have the rectangular geometry or the geometry of a rectangle of which one side is removed, the corresponding cross sections of the connector joint regions 41E, 42C, and 43A shown in FIG. 4 are formed in shapes of the rectangle of which one side is removed, hollow rectangle shapes (obtained after the connector 3 is pressed), or the like. Here, the connector joint region 43A may be formed so as to contact with a top end of the bus bar joint region 21A in the axial direction A in addition to the outside of the bus bar joint region 21A in the radial direction R. This can further ensure reliable electrical connection between the bus bar joint region 21A and the connector joint region 43A.

As shown in FIG. 3, the strip plate regions $41q$, $42q$, and $43q$ are, for example, strip shaped (square) plates to establish electrical connection between the inside and the outside of the connector 3. The strip plate regions $41q$, $42q$, and $43q$ are spaced from each other at a predetermined interval to secure a distance for insulation, and placed, as shown in FIG. 4, so as to protrude outward in the axial direction A, for example, from the end region $3t$ of the connector 3. Alternatively, the strip plate regions $41q$, $42q$, and $43q$ may be placed so as to protrude outward in the radial direction R from a side face of the connector insulator 31, for example. Still, orientations of the strip plate regions $41q$, $42q$, and $43q$ are preferably aligned to each other in terms of thickness as shown in FIG. 3. In this case, the strip plate regions $41q$, $42q$, $43q$ and a device to be connected to the connector 3 can be readily coupled to each other.

<Features of Bus Bar and Other Components in this Embodiment>

<Feature 1>

As shown in FIG. 1 (a), the conductors and the insulators are alternately arranged from inside to outside along the radial direction R in the bus bar 2. Specifically, the bus bar 2 includes the bus bar insulator 22, the bus bar conductor 23, the bus bar insulator 24, the bus bar conductor 25, and the bus bar insulator 26, which are sequentially mounted from inside to outside along the radial direction R on the outer surface (on the outside in the radial direction R) of the bus bar center conductor 21. In other words, the bus bar center conductor 21, the bus bar insulators 22 and 24, and the bus bar conductors 23 and 25 are substantially concentrically installed in the bus bar 2. Accordingly, compared to a conventional bus bar produced with a process of punching a metal plate, a yield per metal material can be improved, which can lead to reduced waste of materials at the time of production. As a result, raw material costs can be reduced with respect to the materials of the bus bar 2.

Moreover, the bus bar conductors 23 and 25 have, in their cross sections viewed from the axial direction A, the openings 23o and 25o that extend across the bus bar conductors 23 and 25 in the axial direction A. In this way, at the time of production of the bus bar 2, the bus bar conductor 23 can be placed, as shown in FIGS. 2 (a3) and (b3), on the bus bar insulator 22 from outside to inside in the radial direction R from the bottom to the top in the drawing. Further, as shown in FIGS. 2 (a5) and (b5), it is also possible to place the bus bar conductor 25 on the bus bar insulator 24 from outside to inside in the radial direction R (from bottom to top in the drawing). Here, when the bus bar conductors 23 and 25 are tubular (not illustrated), the bus bar conductors 23 and 25 should be inserted over the bus bar insulators 22 and 24 at the time of production of the bus bar 2. However, in the above-described constitution, because the bus bar conductors 23 and 25 can be placed on the bus bar insulators 22 and 24 as shown in FIGS. 2 (a3), (b3), (a5), and (b5), the insertion of the bus bar conductors 23 and 25 are not needed. Thus, as shown in FIG. 4, it is possible to provide the protrusions (the protruding regions 22B and 24D outwardly protruding in the radial direction R) to the components (the bus bar insulators 22 and 24) located on an inner side of the bus bar conductors 23 and 25, while it is also possible to form the bus bar 2 in the bent shape.

<Feature 2>

The conductors (the bus bar center conductor 21 and the bus bar conductors 23 and 25) forming the bus bar 2 are formed by any one of aluminum, copper, aluminum alloy, and copper alloy. Note that materials consisting mostly of the above-listed material are also applicable. The listed materials are low in specific resistance, and superior in workability. In other words, the material appropriate to conductors is used for the conductors that constitute the bus bar 2. In this way, electrical connection can be established in the bus bar 2 with greater reliability.

Meanwhile, the bus bar insulators 22, 24, and 26 in the bus bar 2 are formed by the mixture of organic and inorganic materials, or the organic material. In general, a majority of the organic materials such as a polymeric compound and of the inorganic materials such as silica have been known for a greater dielectric breakdown voltage that exceeds 10 kV/mm (refer to, for example, "Plastics" vol. 52, No. 4, p. 158 to 163, Kogyo Chosakai Publishing Co., Ltd., April, 2001). For this reason, as long as the voltage to be applied is at a level of several kilovolts, even an insulator of which thickness is approximately 1 mm is able to provide sufficient insulation. In other words, the material appropriate to insulators is used for the bus bar insulators 22, 24, and 26. In this way, insulation in the bus bar 2 can be further ensured with reliability.

In addition, when the mixture of organic and inorganic materials is used for the bus bar insulators 22, 24, and 26, the following effect is obtained. The coefficients of linear expansion of organic materials are generally greater than those of metallic materials and of inorganic materials. For this reason, the difference in coefficient of linear expansion between the conductor and the insulator can be reduced by using the mixture of organic and inorganic materials for the bus bar insulators 22, 24, and 26, which can, in turn, lead to improved durability of the bus bar 2.

<Feature 3>

In the bus bar 2 according to this embodiment, the bus bar center conductor 21 and the bus bar conductors 23 and 25 are treated by plating on the contact surfaces (the bus bar joint regions 21A, 23C, and 25E) to be contacted with the connector conductors 43, 42, and 41 (specifically, in their connector joint regions 43A, 42C, and 41E). Thus, the above-described contact surfaces have high anti-corrosion properties and superior resistance to wear and abrasion. Further, the contact surfaces are smoothened by the plating, so that the area of contact between the conductors (the bus bar joint regions 21A, 23C, and 25E) that constitute the bus bar and the connector conductors (the connector joint regions 43A, 42C, and 41E) is increased, and the electrical resistance is accordingly reduced. In this way, the effects of the anti-corrosion properties, the resistance to wear and abrasion, and the lower electrical resistance that electrical connection can further ensure reliable electrical connection between the conductors (the bus bar joint regions 21A, 23C, and 25E) forming the bus bar 2 and the connector conductors (the connector joint regions 43A, 42C, and 41E).

<Feature 5>

As shown in FIG. 4, among a group of the bus bar center conductor 21, the bus bar conductors 23, 25, and the bus bar insulators 22, 24, and 26, a member positioned more inwardly than another member in the radial direction R is protruded longer toward the outside in the axial direction A than the another member. In the bus bar insulator 22, which is inwardly adjacent to the bus bar conductor 23 in the radial direction R, the portion protruded outward from the bus bar conductor 23 in the axial direction A (the protruding region 22B) is also protruded outward from the bus bar conductor 23 along the radial direction R. Further, in the bus bar insulator 24, which is inwardly adjacent to the bus bar conductor 25 in the radial direction R, the portion protruded outward from the bus bar conductor 25 along the axial direction A (the protruding region 24D) is also protruded outward from the bus bar conductor 25 along the radial direction R. The protruding regions 22B and 24D increase the creeping distances between the bus bar center conductor 21 and the bus bar conductors 23 and 25 (the shortest distance between conductors measured along the surface of an insulator). Here, even in the absence of the protruding regions 22B and 24D, the creeping distances can be increased by widening intervals between the bus bar joint regions 21A, 23C and 25E in the axial direction. However, according to the present invention, because the protruding regions 22B and 24D are provided, the creeping distances can be extended without increasing the length of the bus bar 2 in the axial direction A. Thus, in the present invention, capability of electrical insulation between the conductors forming the bus bar 2 can be secured with greater certainty without increasing the size of the bus bar 2.

<Feature 7>

In the manufacturing method for the bus bar 2 of this embodiment, as shown in FIGS. 2 (a1) to (a6) and (b1) to (b6), the bus bar insulators 22, 24, and 26 and the bus bar conductors 23 and 25 are stacked in the singly alternating layers from inside to outside in the radial direction R on the outside of the bus bar center conductor 21. Further, as shown in FIGS. 2 (a2), (b2), (a4), (b4), (a6), and (b6), the manufacturing method for the bus bar 2 of this embodiment includes the step of forming the insulating material on the outer periphery of the bus bar center conductor 21 or the bus bar conductor 23 or 25 in the radial direction R, to thereby form the bus bar insulators 22, 24, and 26 (the above-described process steps 1, 3, and 5). Still further, as shown in FIGS. 2 (a3), (b3), (a5), and (b5), the manufacturing method for the bus bar 2 of this embodiment also includes the step of placing the bus bar conductors 23 and 25 on the bus bar insulators 22 and 24 from outside to inside in the radial direction R (the above-described process steps 2 and 4). In particular, since the place-on step is included, it is possible to provide the components (the bus bar insulators 22 and 24) located on the inner side of the bus bar conductors 23 and 25 with the protrusions (the protruding regions 22B and 24D outwardly protruded along the radial direction R), and it is also possible to form the bus bar 2 in the bent shape.

<Feature 8>

As shown in FIG. 4, the connector 3 is formed in a condition capable of engaging with the end of the bus bar 2 in the bus bar and connector 1 (the bus bar 2 and the connector 3). Further, the end of the bus bar 2 is inserted into the connector 3. That is, the joints between the conductors (the bus bar center conductor 21, and the bus bar conductors 23 and 25) forming the bus bar 2 and the connector conductors 43 to 41 are positioned inside the connector 3 and covered by the connector 3. This can ensure reliable isolation of the joints from the outside of the bus bar and connector 1.

In the bus bar and connector 1, the bus bar 2 and the connector 3 are engaged and electrically connected to each other by pressing, from outside to inside in the radial direction R, the connector 3 with the end of the bus bar 2 having been inserted therein. This means that connection between the bus bar 2 and the connector 3 can be established only by the above-described pressing action rather than connecting a plurality of the conductors (the bus bar center conductor 21, and the bus bar conductors 23 and 25) forming the bus bar 2 to a plurality of the connector conductors 43 to 41 one by one. In this way, the need to engage the conductors of the bus bar 2 with the conductors of the connector 3 by means of screw fixation is eliminated, so that the bus bar 2 can be readily connected to the connector 3, leading to reduction in man-hours required for the connection.

Moreover, in the bus bar and connector 1, the connector 3 is pressed as described above. This ensures firm contact between the conductors forming the bus bar 2 (the bus bar center conductor 21, and the bus bar conductors 23 and 25) and the connector conductors 43 to 41. Accordingly, reliable electrical connection can be established between the bus bar 2 and the connector 3.

<Feature 9>

In the bus bar and connector 1, the moduli of compression elasticity of the bus bar insulators 22, 24 and 26 are greater than that of the connector insulator 31. For this reason, when the connector 3 is pressed, the connector 3 is deformed more easily than the bus bar 2. This can facilitate the pressing of the connector 3, and thus cause the conductors forming the bus bar 2 (the bus bar center conductor 21, and the bus bar conductors 23 and 25) to be more securely contacted with the connector conductors 43 to 41. In this way, electrical connection between the bus bar 2 and the connector 3 can be established with greater reliability.

<Feature 10>

In the bus bar and connector 1, a plurality of the connector joint regions 41E, 42C, and 43A are shifted from each other along the axial direction A so that they are respectively contacted with the conductors forming the bus bar 2 (the bus bar joint regions 21A, 23C, and 25E) in the state where the end of the bus bar 2 is inserted into the connector 3. In this way, as opposed to a case where the plurality of connector joint regions 41E, 42C, and 43A are otherwise placed without the shifting along the axial direction A, the connector conductors 41 to 43 can be isolated from each other with greater certainty.

Moreover, the connector 3 is integrated into one unit by filling the connector insulator 31 in the gaps between the plurality of connector conductors 41 to 43. This causes the connector conductors 41 to 43 to be isolated from each other, and facilitates handling of the connector 3 compared to a case where the connector 3 is not integrated into one unit.

<Feature 11>

As shown in FIG. 3, the connector insulator 31 includes the embedded body 34 of which modulus of compression elasticity is smaller than that of the main connector insulator 32. Accordingly, compared to a connector in which the connector insulator 31 is composed only of the main connector insulator 32, the connector 3 can be readily pressed. As a result, more firm electrical connection can be established between the bus bar 2 and the connector 3.

The embedded body 34 is embedded in the notch 33 of the main connector insulator 32. Thus, the connector 3 can be isolated more surely from the outside of the connector 3 than that in a case where the embedded body 34 is not embedded in the notch 33.

Meanwhile, the notch 33 is formed along the axial direction A of the main connector insulator 32 (the axial direction A of the bus bar 2 inserted into the connector 3). This ensures more firm contact between the bus bar joint regions 21A, 23C, and 25E disposed in the shifted arrangement along the axial direction A and the connector joint regions 43A, 42C and 41E.

<Modification 1>

FIG. 4 shows a connector joint region 143A and other components according to a first modification with a chain double-dashed line. As shown in FIG. 4, a hole 121A may be formed in the bus bar center conductor 21, in which a connector joint region 143A of the connector conductor 43 intended to contact with the bus bar center conductor 21 can be inserted along the axial direction (into the inside along the axial direction A). In this case, more firm electrical connection can be established between the bus bar center conductor 21 and the connector conductor 43. The connector joint region 143A and the hole 121A will be described in detail further below.

<Modification 2>

Figure 5:
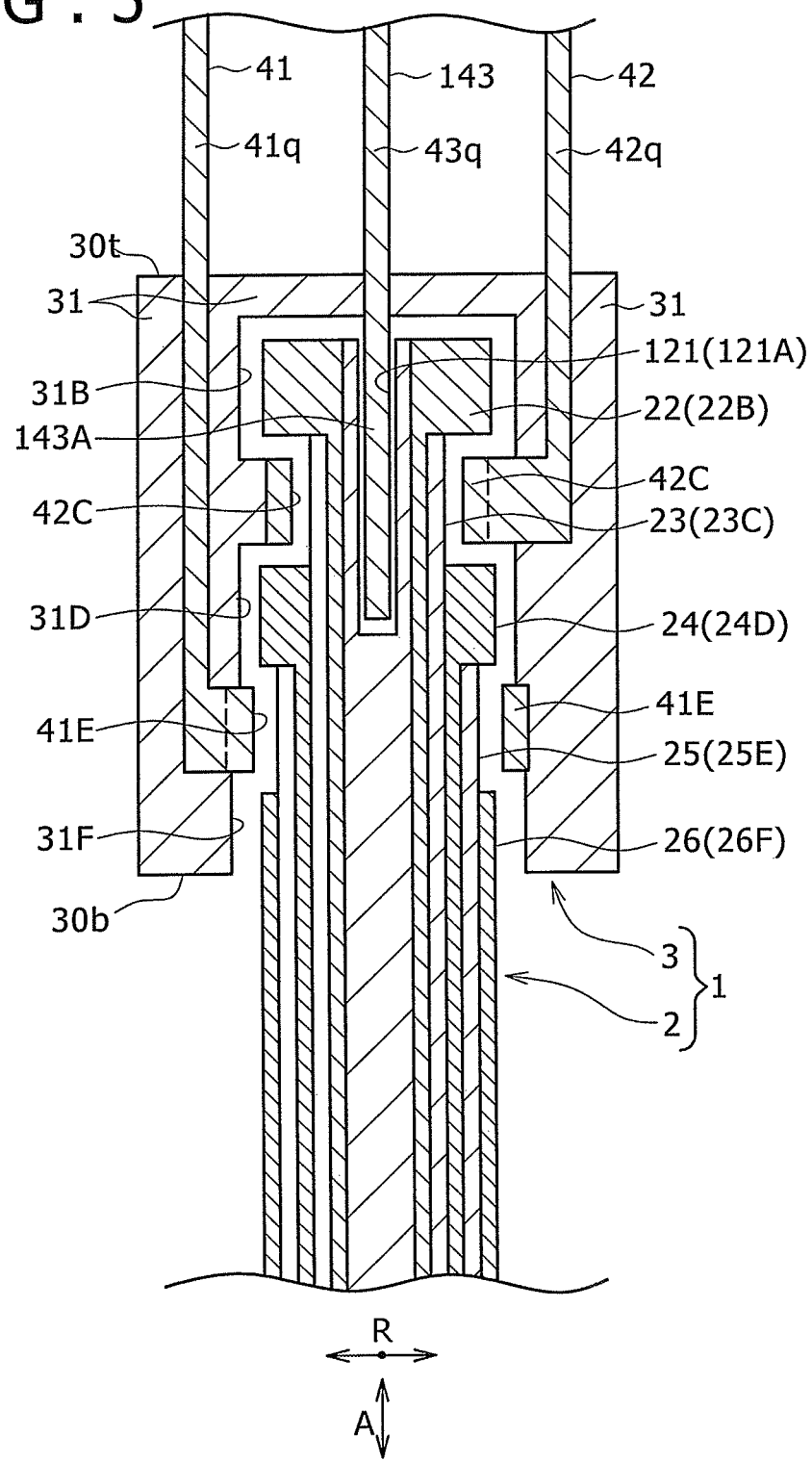
FIG. 5 is a cross section view showing a bus bar and a connector in a second modification.

FIG. 5 shows the bus bar 2 and the connector 3 according to a second modification.

In the bus bar 2 of the second modification, a bus bar center conductor 121 has the hole 121A into which a connector conductor 143 intended to contact with the bus bar center conductor 121 can be inserted (along the axial direction A) at a position located on an internal region in the radial direction R. Namely, the hole 121A is a feature corresponding to the bus bar joint region 21A shown in FIG. 4. As shown in FIG. 5, the bus bar center conductor 121 is not protruded outward from the protruding region 22B in the axial direction A. In particular, the end of the bus bar center conductor 121 in the axial direction A (the top end in FIG. 5) is flush with the protruding region 22B in the axial direction A. Here, the bus bar center conductor 121 may be a sleeve shaped component (not illustrated), and provided with the hole 121A resulting from the sleeve shape. In addition, the connector joint region 143A of the connector conductor 143 is formed in a shape allowing insertion into the hole 121A (for example, in the shape of a rod such as a rectangular column or a circular column).

<Features of Bus Bar in Modification 2>
<Feature 4>

As shown in FIG. 5, the bus bar center conductor 121 can be electrically connected to the connector conductor 143 in the bus bar 2 of the second modification by inserting the connector conductor 143 (the connector joint region 143A) into the hole 121A in the bus bar center conductor 121. This can eliminate the necessity to protrude the bus bar center conductor 121 outward from the bus bar insulator 22 (the protruding region 22B) along the axial direction A. Thus, the length of the bus bar 2 can be reduced in the axial direction A.

Note that, in this way, the length of the connector 3 to be connected to the bus bar 2 can be accordingly reduced in the axial direction A.

<Modification 3>

FIGS. 6 (a) and (b) shows the bus bar 2 according to a third modification. As shown in FIG. 6 (a), the bus bar insulators 22 and 24 do not have to include the insulator openings 22o and 24o (refer to FIG. 1 (a)). Further, the protruding regions 22B, 24D and the end region 26F shown in FIG. 1 (b) may be deformed in the shapes of protruding regions 122Ba, 124Da, 122Bb, and 124Db, and an end region 126F shown in FIG. 6 (b).

As shown in FIG. 6 (b), the protruding regions 122Ba and 124Da, and the end region 126F are formed in such a manner that their outer ends in the radial direction R are roundly protruded when the bus bar 2 is laterally viewed (from a direction orthogonal to the axial direction A). More specifically, the protruding regions 122Ba and 124Da, and the end region 126F are formed in shapes that their central portions are protruded more outwardly along the radial direction R than both end portions in the axial direction A. When the bus bar 2 is laterally viewed, the protruding portion is shaped, for example, like a semicircle, a semiellipse, or the like.

In addition, the protruding regions 122Bb and 124Db are formed in shapes that their outer ends in the radial direction R are recessed when the bus bar 2 is laterally viewed. More specifically, the protruding regions 122Bb and 124Db are formed in shape with their center portions, which are recessed into an inner side in the radial direction R relative to the both end portions in the axial direction A. When the bus bar 2 is laterally viewed, the recessed portion is shaped, for example, like a semicircle, a semiellipse, or the like in a side view of the bus bar 2.

In this case, the recessed regions 31B, 31D, and 31F in the connector 3 shown in FIG. 4 are accordingly formed in shapes capable of engaging with the above-described protruding regions (or the end region 126F).

When the bus bar insulators 22 and 24 are formed, the bus bar center conductor 21 or the bus bar conductor 23 may not be retained in some cases at a position of a cross section F5a (refer to FIG. 6 (b)) by the mold (refer to the mold M3 in FIG. 2 (b1) and the mold M2 in FIG. 2 (a2) for the retaining). In these cases, as shown in FIG. 6 (a), the insulator openings 22o and 24o (refer to FIG. 1 (a)) are not formed. Namely, in the cross section F5a (refer to FIG. 6 (b)), the bus bar insulators 22 and 24 cover the entire outer periphery of the bus bar center conductor 21 and the bus bar conductor 23 in the radial direction R as shown in FIG. 6 (a). In this case, the bus bar insulators 22 and 24 are able to isolate the conductors from each other more securely than those in a case where the insulator opening 22o or 24o (refer to FIG. 1 (a)) is formed.

<Modification 4>

Although the fastening unit 10 exerts a pressing force on the connector 3 in the above-described embodiment as shown in FIG. 3, the connector 3 may be pressed by other ways. For example, an elastic component such as a spring or a rubber band may be attached around the connector 3, to thereby apply a pressure on the connector 3.

Embodiment 2

FIG. 7 (a), (b), (c), and FIG. 8 (a), (b) show a bus bar 202 and a connector 203 of a second embodiment. Here, FIG. 7 (a) is a cross section viewed from an F7a arrow in FIG. 7 (b). FIG. 7 (c) is an F7c arrow view of FIG. 7 (b). FIG. 8 (b) is an F8b arrow view of FIG. 8 (a) (a perspective view of the connector 203 in FIG. 8 (a) viewed from oblique below). The second embodiment is different in the structure of an end of the bus bar 202 and the structure of the connector 203 from the first embodiment. As shown in FIGS. 7 (b) and (c), the bus bar 202 includes at its end a bus bar insulator 227 and bus bar joint regions 223C and 225E.

The bus bar insulator 227, which is an insulator located at the end of the bus bar 202 in the axial direction A (a region outside the bus bar insulator 26 in the axial direction A), functions to isolate the bus bar center conductor 21 and the bus bar conductors 23 and 25 from each other. Namely, the bus bar insulator 227 corresponds to the insulating material around the protrusions shaped like the disc insulator for transmission line (the protruding regions 24D and 22B) shown in FIG. 1. Note that a rightmost portion of the bus bar 202 shown in FIGS. 7 (b) and (c) is depicted in a state where the bus bar insulator 227 indicated by a chain double-dashed line is removed from the bus bar 202.

As shown in FIG. 7 (a), (b), (c) and FIG. 8 (a), the bus bar joint regions 223C and 225E are, for example, plate shaped joints connected to the connector 203. The bus bar joint regions 223C and 225E are formed on the end regions of the bus bar conductors 23 and 25 in the axial direction A, and designed to outwardly protrude from the bus bar insulator 227 along the radial direction R. Specifically, as shown in FIG. 8 (a), the surfaces that define the bus bar insulator 227 include a surface 227a at an end in the axial direction A, from which the bus bar joint region 21A is protruded outward along the axial direction A, and a surface 227b orthogonally adjoining the surface 227a, from which the bus bar joint regions 223C and 225E are protruded outward along the radial direction R.

Further, the bus bar joint regions 223C and 225E are, as shown in FIG. 7 (b), are arranged side by side on a circumferential direction around the axial direction A. In other words, the bus bar joint regions 223C and 225E are not placed in shifted (spaced) arrangement along the axial direction A as in the case of the bus bar joint regions 23C and 25E shown in FIG. 1, but placed in side-by-side arrangement with a spacing along a direction orthogonal to the axial direction A (a vertical direction in FIGS. 7 (a) and (b)). It should be noted that, in FIGS. 7 (b) and (c), although the bus bar joint regions 223C and 225E are displaced from each other along the axial direction A for purposes of brevity, they need not be shifted as such.

Meanwhile, the widths (the length in the axial direction A) and the thicknesses of the bus bar joint regions 223C and 225E are defined in such a manner that cross sectional areas of the bus bar joint regions 223C and 225E viewed from a direction along which the bus bar joint regions 223C and 225E are protruded (the vertical direction in FIG. 7 (c)) are greater than or equal to a predetermined value. Specifically, in order to obtain the cross sectional area of 8 mm$^2$ or greater, the bus bar joint regions 223C and 225E may be defined to be 10 mm in width in the axial direction A and 1 mm in thickness or the like. In addition, a hole may be formed in the bus bar joint region 223C, 225E as shown in FIG. 8 (a) (which will be described below).

Moreover, the bus bar joint regions 223C and 225E are formed as described below. In the bus bar conductor 23, 25 of which cross section viewed from the axial direction A has the geometry of a rectangle from which one side of the rectangle is removed, as shown in FIG. 1 (a), an incision is made in a region corresponding to another side of the rectangle at a position inwardly located away from the end of the bus bar conductor 23, 25 in the axial direction A (inwardly located away from the end by approximately 10 mm, for example). Then, as shown in FIG. 7 (a), the cross section is formed in the shape of a letter "L" by not bending a portion between the incision and the end in the axial direction A (alternatively, by bending the portion once to form the rectangle and then expanding the bent portion as shown by an arrow in FIG. 7 (a) after the one side of the rectangle is removed). In this way, the "L" shaped portion, which protrudes outward from the bus bar insulator 227, constitutes the bus bar joint region 223C, 225E. In addition, the bus bar joint regions 223C and 225E may be cut off while leaving their predetermined lengths from the bus bar insulator 227 untouched, to thereby shorten the bus bar joint regions 223C and 225E. In this case, the connector 203 can be prevented from increasing in size more than necessary.

As shown in FIG. 8 (a), the connector 203 is designed to be attached to the end of the above-described bus bar 202 in the axial direction A and engaged with the bus bar joint regions 21A, 223C, and 225E so that electrical connection can be established. The connector 203 includes a connector insulator 231 of, for example, an L-shaped block, and the connector joint regions 241E, 242C, and 243A as shown in FIG. 8 (b).

The connector insulator 231 has three slit-shaped slots with connector joint regions 241E, 242C, and 243A positioned inside (on inner surfaces of) the slots. The slot in which the connector joint region 243A is positioned is formed across two adjacent surfaces (surfaces 231a and 231c). In this connection, in an outer surface of the connector insulator 231, a surface including the slots in which the connector joint regions 241E and 242C are positioned is defined as a surface 231b.

The connector joint regions 241E, 242C, and 243A are regions to be electrically connected to the bus bar joint regions 225E, 223C, and 21A (refer to FIG. 8 (a)) inserted into the slit-like slots in the connector insulator 1, respectively. The connector joint regions 241E, 242C, and 243A are respectively formed by two plates capable of holding the bus bar joint region by means of, a spring force. In addition, the connector joint regions 241E and 242C may include protrusions (not illustrated) to be fitted in holes formed in the bus bar joint regions 223C and 225E shown in FIG. 8 (a). When the holes and protrusions are formed, the connector 203 can be attached to the bus bar 202 more reliably.

The connector 203 is attached to the bus bar 202 as described below. Firstly, the bus bar joint regions 223C and 225E are inserted into (the slots in the connector insulator 231, which incorporate) the connector joint regions 241E and 242C as shown in FIGS. 8 (a) and (b). Namely, the bus bar 202 is attached to the connector 203 in such a manner that the surface 227b of the bus bar 202 shown in FIG. 8 (a) is opposed to the surface 231b of the connector 203 shown in FIG. 8 (b) while contacting to each other. At this time, because the slot is formed not only on the surface 231a but also on the surface 231c in the connector insulator 231 as shown in FIG. 8 (b), the bus bar joint region 21A is inserted into the connector joint region 243A shown in FIG. 8 (b). Consequently, the surface 231a is placed in position opposed to the surface 227a of the bus bar.

<Features of Bus Bar in Embodiment 2>
<Feature 6>

As shown in FIG. 7 (b) (c), the axial A end regions of the plurality of bus bar conductors 23 and 25 of the bus bar 202 respectively include the bus bar joint regions 223C and 225E, which are formed so as to be protruded outward in the radial direction R from the bus bar insulator 227. Electrical connection can be established between the bus bar 202 and the connector 203 (refer to FIG. 8 (a) (b)) by means of the bus bar joint regions 223C and 225E.

Further, a plurality of the bus bar joint regions 223C and 225E in the bus bar 202 are arranged side by side along the circumferential direction about the axial direction A. As a result, when compared to a case where the plurality of bus bar joint regions 223C and 225E are arranged side by side along the axial direction A (refer to FIG. 1 (b)), the length of the bus bar 202 in the axial direction A can be reduced, to thereby make terminal portions of the bus bar 202 compact in size.

<Modification of Embodiment 2>

The connector 203 shown in FIG. 8 (a) (b) may be variously changed in structure. In FIG. 8 (a), the connector 203 is designed to receive the bus bar 202 that is attached to the connector 203 along a direction in which the bus bar joint regions 223C and 225E of the bus bar 202 are protruded (from bottom to top in FIG. 8 (a)). However, the bus bar 202 may be attached to the connector 203, for example, along the axial direction A. Further, the connector 203, which is integrated into one unit by filling the gap between the connector joint regions 241E, 242C, and 243A with the connector insulator 231 as shown in FIG. 8 (b), may be, for example, separated into a plurality of components. For example, the connector 203 may be separated into a portion equipped with the connector joint regions 241E and 242C and a portion equipped with the connector joint region 243A. Still further, in FIG. 8 (a), the bus bar joint regions 21A, 223C, and 225E are inserted into the slit-like slots, to thereby establish electrical connection between the connector 203 and the bus bar 202. However, the bus bar joint region 21A, 223C or 225E may be held, for example, by the connector joint region in a shape of a crocodile clip (not illustrated), to electrically connect the connector 203 to the bus bar 202.

<Other Modifications>

In each of the above-described embodiments, as shown in FIG. 1 and the like, the number of conductors in the bus bar 2 (202) is three, consisting of the bus bar center conductor 21, the bus bar conductor 23, and the bus bar conductor 25. However, the number of conductors may be two or more, and the present invention is applicable regardless of the number of conductors as long as the number is greater than or equal to two. For example, the present invention may be also applied to electrical connection with polyphase alternating currents other than three-phase alternating currents or single-phase alternating current.

Although the embodiments and examples of the present invention have been described above, the present invention is not limited to the above-described embodiments or examples, and may be changed and embodied in various ways without departing from the scope of the appended claims. This application is based on Japan Patent Application (No. 2010-216414) filed on Sep. 28, 2010, which is incorporated herein by reference in its entirety.

REFERENCE SIGNS LIST 1, 201 bus bar and connector
2, 202 bus bar
3, 203 connector 21, 121 bus bar center conductor
22, 24, 26, 227 bus bar insulator
22B, 24D, 122Ba, 122Bb, 124Da, 124Db protruding region (region protruded toward radial outside)
23, 25 bus bar conductor
23o, 25o opening
31 connector insulator
32 main connector insulator
33 notch
34 embedded body
41, 42, 43 connector conductor
41E, 42C, 43A, 143A connector joint region
121A hole
223C, 225E bus bar joint region (bus bar joint region formed so as to protrude outward in radial direction from bus bar insulator)
A axial direction
R radial direction

The invention claimed is:

1. A bus bar used for electrical connection, comprising:
a bus bar center conductor, and
a plurality of bus bar insulators and a plurality of bus bar conductors provided on an outside of the bus bar center conductor, and alternately arranged from inside to outside in a radial direction orthogonal to an axial direction of the bus bar center conductor;
wherein on each of the bus bar conductors, an opening is formed across the entire bus bar conductor in the axial direction.

2. The bus bar according to claim 1, wherein:
the bus bar center conductor and the bus bar conductors are formed by any one of aluminum, copper, aluminum alloy, and copper alloy, and
the bus bar insulators are formed by a mixture of organic and inorganic materials, or formed by an organic material.

3. The bus bar according to claim 1, wherein a contact surface in contact with a connector conductor, which is designed to make contact with the bus bar center conductor and the bus bar conductors, is plated in the bus bar center conductor and the bus bar conductors.

4. The bus bar according to claim 1, wherein a hole is formed on the bus bar center conductor into which a connector conductor to be contacted with the bus bar center conductor can be inserted along the axial direction.

5. The bus bar according to claim 1, wherein:
among the bus bar conductors and the bus bar insulators, a member positioned more inwardly than another member in the radial direction is protruded longer toward the outside in the axial direction compared to the another member, and
in the bus bar insulator, which is inwardly adjacent to the bus bar conductor in the radial direction, a portion protruded outward in the axial direction from the bus bar conductor is protruded outward in the radial direction from the bus bar conductor.

6. The bus bar according to claim 1, wherein:
each end of the plurality of bus bar conductors in the axial direction includes a bus bar joint region formed so as to protrude outward from the bus bar insulator in the radial direction, and
a plurality of the bus bar joint regions are arranged side by side on a circumferential direction about the axial direction.

7. A bus bar manufacturing method for manufacturing the bus bar according to claim 1, comprising:

a step of forming an insulating material on an outer periphery of the bus bar center conductor and the bus bar conductors in the radial direction, to thereby form the bus bar insulator, and
a step of placing the bus bar conductor on the bus bar insulator from outside to inside in the radial direction,
wherein the bus bar insulators and the bus bar conductors are outwardly stacked in singly alternating layers on an outside of the bus bar center conductor.

8. A bus bar and connector, comprising the bus bar according to claim 5 and a connector formed so as to engage with an end of the bus bar, wherein:
the connector comprises a connector insulator, and a plurality of connector conductors capable of making contact with the bus bar center conductor and the bus bar conductors, and
the connector in which the end of the bus bar is inserted is pressed from outside to inside in the radial direction, to thereby connect the bus bar and the connector.

9. The bus bar and connector according to claim 8, wherein a modulus of compressive elasticity of the bus bar insulator is greater than that of the connector insulator.

10. The bus bar and connector according to claim 8, wherein:
a plurality of the connector conductors respectively comprise connector joint regions;
a plurality of the connector joint regions are disposed in a shifted manner so as to be respectively in contact with the bus bar center conductor or the bus bar conductors in a condition where the end of the bus bar is inserted in the connector, and
a gap between the plurality of connector conductors is filled with the connector insulator, to thereby integrate the connector into one unit.

11. The bus bar and connector according to claim 8, wherein:
the connector insulator comprises a main connector insulator and an embedded body of which modulus of compressive elasticity is smaller than that of the main connector insulator, and
the embedded body is embedded in a notch of the main connector insulator.

12. A bus bar manufacturing method for manufacturing the bus bar according to claim 2, comprising:
a step of forming an insulating material on an outer periphery of the bus bar center conductor and the bus bar conductors in the radial direction, to thereby form the bus bar insulator, and
a step of placing the bus bar conductor on the bus bar insulator from outside to inside in the radial direction,
wherein the bus bar insulators and the bus bar conductors are outwardly stacked in singly alternating layers on an outside of the bus bar center conductor.

13. A bus bar manufacturing method for manufacturing the bus bar according to claim 3, comprising:
a step of forming an insulating material on an outer periphery of the bus bar center conductor and the bus bar conductors in the radial direction, to thereby form the bus bar insulator, and
a step of placing the bus bar conductor on the bus bar insulator from outside to inside in the radial direction,
wherein the bus bar insulators and the bus bar conductors are outwardly stacked in singly alternating layers on an outside of the bus bar center conductor.

14. A bus bar manufacturing method for manufacturing the bus bar according to claim 4, comprising:

a step of forming an insulating material on an outer periphery of the bus bar center conductor and the bus bar conductors in the radial direction, to thereby form the bus bar insulator, and a step of placing the bus bar conductor on the bus bar insulator from outside to inside in the radial direction, wherein the bus bar insulators and the bus bar conductors are outwardly stacked in singly alternating layers on an outside of the bus bar center conductor.

15. A bus bar manufacturing method for manufacturing the bus bar according to claim 5, comprising:

a step of forming an insulating material on an outer periphery of the bus bar center conductor and the bus bar conductors in the radial direction, to thereby form the bus bar insulator, and a step of placing the bus bar conductor on the bus bar insulator from outside to inside in the radial direction, wherein the bus bar insulators and the bus bar conductors are outwardly stacked in singly alternating layers on an outside of the bus bar center conductor.

16. A bus bar manufacturing method for manufacturing the bus bar according to claim 6, comprising:

a step of forming an insulating material on an outer periphery of the bus bar center conductor and the bus bar conductors in the radial direction, to thereby form the bus bar insulator, and a step of placing the bus bar conductor on the bus bar insulator from outside to inside in the radial direction, wherein the bus bar insulators and the bus bar conductors are outwardly stacked in singly alternating layers on an outside of the bus bar center conductor.

17. The bus bar and connector according to claim 9, wherein:

a plurality of the connector conductors respectively comprise connector joint regions;

a plurality of the connector joint regions are disposed in a shifted manner so as to be respectively in contact with the bus bar center conductor or the bus bar conductors in a condition where the end of the bus bar is inserted in the connector, and a gap between the plurality of connector conductors is filled with the connector insulator, to thereby integrate the connector into one unit.

* * * * *